Jan. 9, 1968

C. M. SMITH 3,363,215

GROUNDING ONLY RECEPTACLE WITH PIVOTALLY MOUNTED SHUTTER

Filed April 12, 1965

WITNESSES
Theodore F. Wrobel
James F. Young

INVENTOR
Clarence M. Smith
BY
E. F. Possessky
ATTORNEY

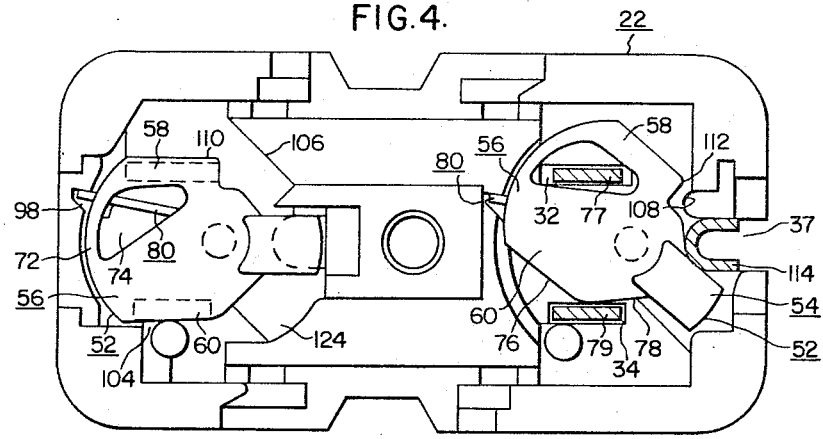
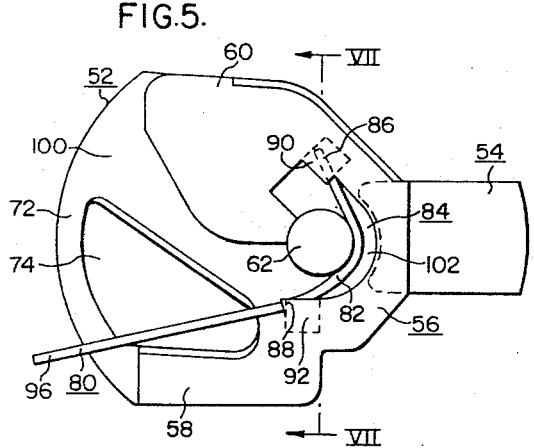
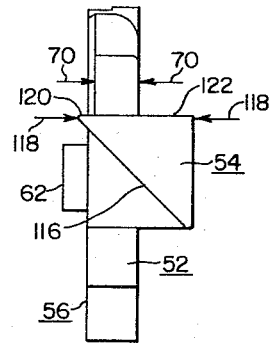
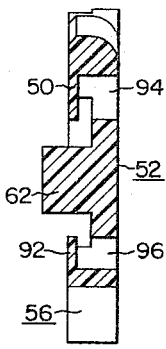
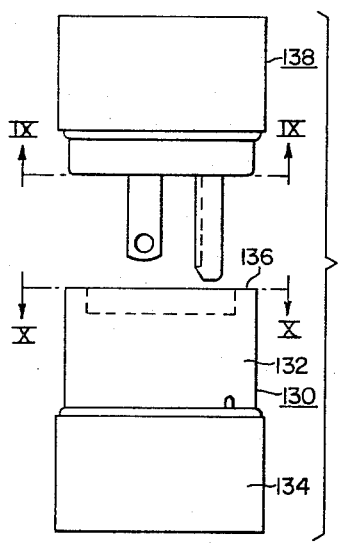
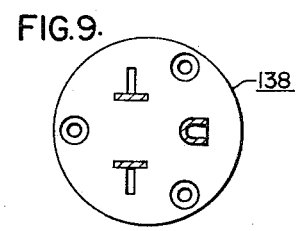
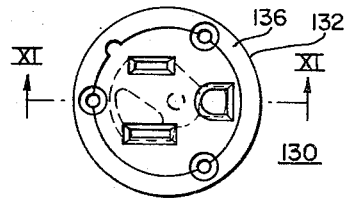

United States Patent Office 3,363,215
Patented Jan. 9, 1968

3,363,215
GROUNDING ONLY RECEPTACLE WITH PIVOTALLY MOUNTED SHUTTER
Clarence M. Smith, Bridgeport, Conn., assignor to Westinghouse Electric Corporation, Pittsburgh, Pa., a corporation of Pennsylvania
Filed Apr. 12, 1965, Ser. No. 447,236
9 Claims. (Cl. 339—14)

ABSTRACT OF THE DISCLOSURE

A grounding only wiring device or receptacle having a pivotally mounted shutter for blocking entrance of power blades on a plug unless the plug also has a grounding prong. The shutter is actuated by camming actions of the grounding prong and returned to blocking position by a spring.

---

The present invention relates to grounding only receptacles and more particularly to such receptacles in which the shutter structure is pivotally mounted.

One of the primary problems confronted when attempting to incorporate a shutter in a grounding receptacle is that of doing so in extremely limited space. The space limitations stem from industry adopted standards relating to certain receptacle dimensions and include a limited and usually irregularly shaped area across the plane in which the shutter moves and a limited depth or thickness for the shutter movement. The problem thus is to arrange the shutter structure in limited available space so that it cooperates with other receptacle structure to open or block the power blade slots depending on whether an entering plug has a grounding prong. One approach to this problem is to employ shutter structure formed from two relatively narrow pivotally supported pieces as shown in a copending application entitled, "Grounding Wiring Device," Ser. No. 245,222, filed by G. E. Anderson on Dec. 17, 1962, and assigned to the present assignee. In that application, a single pivotable shutter member is also disclosed.

The structural problem just considered is efficiently solved in an improved manner by the present invention with the employment of a single pivotally supported shutter member. In accordance with the broad principles of the invention, a grounding only receptacle comprises a housing having a frontal member with slots arranged to receive the power blades and a grounding prong of a grounding plug. A shutter member is pivotally disposed rearwardly of the frontal housing member. The shutter includes a thin closure portion having blocking or barrier portions normally aligned with the power blade slots and it further includes an actuating portion preferably having a greater thickness than that of the closure portion and normally aligned with a grounding prong slot.

The shutter is pivoted by the engagement of the grounding prong of a grounding plug with the shutter actuating portion so as at least partially to open the power blade slots for full entry of the plug. When the shutter is pivoted to the open position, one of the plug blades extends through an opening in the shutter closure portion while the other blade is disposed outwardly of the outer periphery of the shutter closure portion. Spring means are efficiently connected between the shutter and the receptacle housing to provide spring return for the shutter when the plug is removed.

It is therefore an object of the invention to provide a novel grounding only receptacle in which reliable grounding only operation is furnished while efficient use is made of limited available shutter space.

Another object of the invention is to provide a novel grounding only receptacle which can be conveniently manufactured.

An additional object of the invention is to provide a novel grounding only receptacle in which the shutter is efficiently supported for pivotal spring return.

These and other objects of the invention will become more apparent upon consideration of the following detailed description along with the attached drawings, in which:

FIG. 4 is similar to FIG. 3 but shows in addition a pair of shutter members assembled with the cover member;

FIG. 5 is a top plan view of a shutter member and spring arm assembly employed in the receptacle of FIG. 1;

FIG. 6 is an end view of the shutter of FIG. 5;

FIG. 7 shows a section of the shutter of FIG. 5 with the spring arm removed;

FIG. 8 is an elevational view of a cord connector connector constructed in accordance with the principles of the invention with a cord plug disposed for attachment thereto;

FIG. 9 shows a section of the plug shown in FIG. 8 taken along the reference line IX—IX of FIG. 8;

FIG. 10 shows a top plan view of the cord connector shown in FIG. 8 taken along the reference line X—X of FIG. 8;

Figure 1:
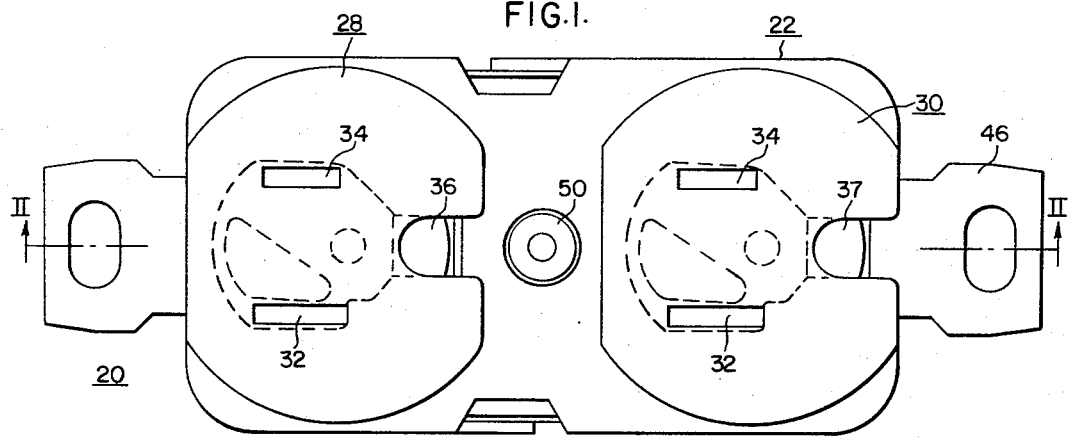
FIGURE 1 is a top plan view of a duplex receptacle constructed in accordance with the principles of the invention.
Figure 2:
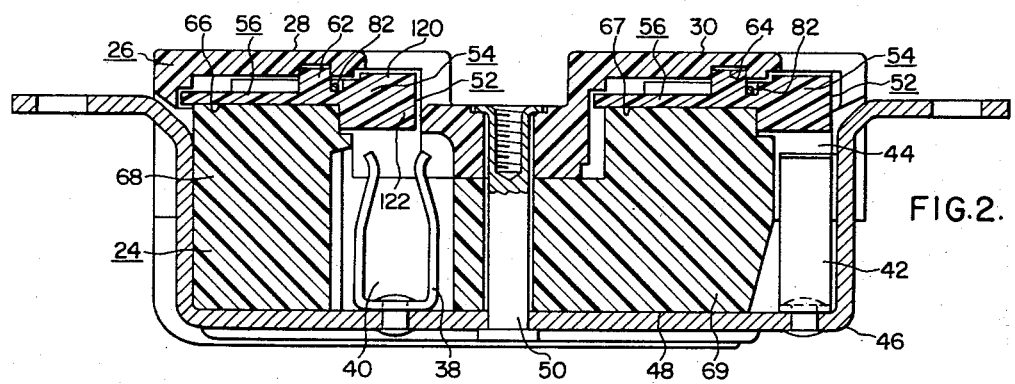
FIG. 2 shows a longitudinal section of the receptacle shown in FIG. 1 taken along the reference line II—II of FIGURE 1.
Figure 3:
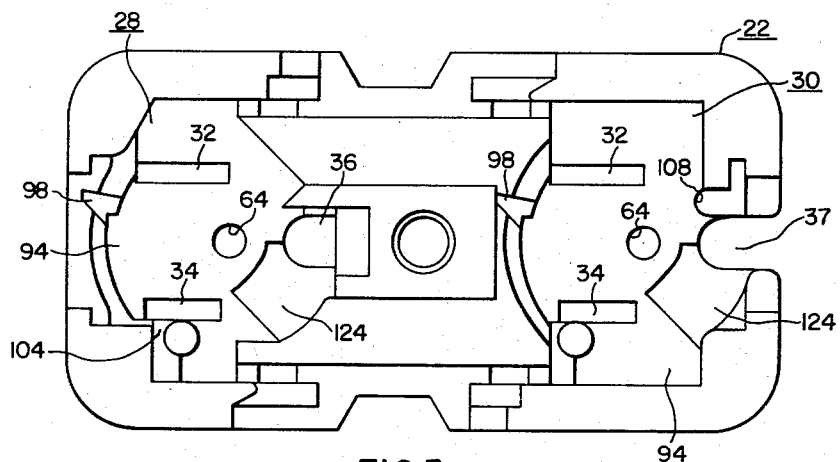
FIG. 3 shows a bottom plan view of a cover member employed in the receptacle of FIG. 1.
Figure 11:
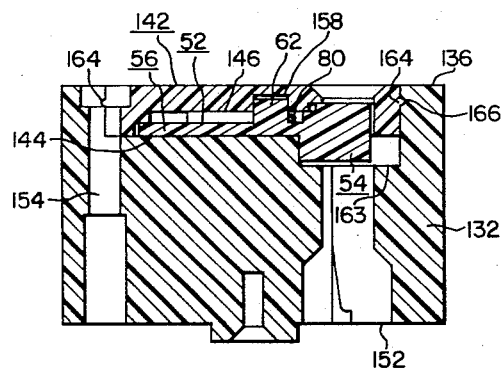
FIG. 11 shows a vertical section of the cord connector shown in FIG. 8, with portions thereof removed, taken along the reference line XI—XI of FIG. 10.
Figure 12:
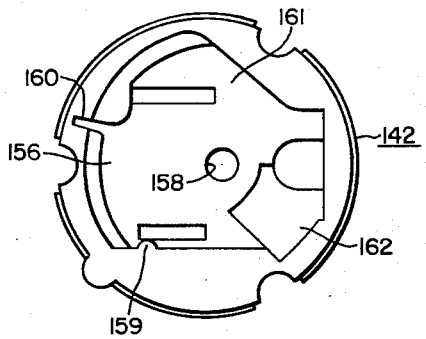
FIG. 12 shows a plan view of the inner side of a frontal disc member of the cord connector of FIG. 8.

More specifically, there is shown in FIGS. 1-4, a grounding only, wall-mountable duplex receptacle 20 constructed in accordance with the principles of the invention. The receptacle 20 is characterized as "grounding only" in the sense that under ordinary circumstances only a grounding plug can be inserted into it. An added element of safety is thus provided where it is desired that equipment plugged into the receptacle 20 be grounded.

The receptacle 20 is constructed to conform to underwriter's dimensional standards for duplex receptacles. It includes an insulative housing 22 comprising in this instance a base member 24 and a frontal cover member 26 having frontal face portions 28 and 30. Each face portion 28 or 30 has power blade slots 32 and 34 and a grounding prong slot 36 or 37 with the standard spacing thereamong.

Within the base 24 there are disposed in a conventional manner a pair of spaced contacts (not shown) in alignment with the slots 32 and 34 in the face portion 28 and another pair of contacts (not shown) in alignment with the slots 32 and 34 in the face portion 30. The base member contacts thus are disposed to make contact with plug blades inserted through the slots 32 and 34 in the face portion 28 or 30.

In addition, a grounding contact 38 is supported in a grounding contact pocket 40 in alignment with the grounding slot 36 in the face portion 28 and a grounding contact 42 is supported in a grounding contact pocket 44 in alignment with the grounding slot 37 in the face portion 30. The grounding contacts 38 and 42 are fastened or riveted to a mounting yoke 46 which preferably wraps about a back side 48 of the receptacle 20 and which is used in conjunction with an eyelet 50 or the like to secure the base 24 and the cover 26 together.

To provide grounding only operation, a shutter member 52 is pivotally supported inwardly of each housing face portion 28 or 30 between the cover 26 and the base 24. The shutter 52 includes an actuating portion 54 in alignment with the grounding slot 36 or 37 and a closure portion 56 having barrier portions 58 and 60 in alignment with the power blade slots 32 and 34. A projecting post 62 extends forwardly from the shutter closure portion 56 and fits into a recess 64 in the cover 26 to provide for pivotal movement of the shutter 52 across a supporting surface 66 or 67 (FIG. 2) of a longitudinally extending centrally located base partition wall 68 or 69.

Due to space limitations between the base 24 and the cover 26, the shutter closure portion 56 is made relatively thin as indicated by the reference character 70 (FIG. 6). Ample strength can be provided for the shutter 52 by forming or molding it from a suitable insulative material such as nylon.

To limit the barrier portions 58 and 60 against inward deflection when the shutter 52 is normally disposed to block entry of the power blades of a non-grounding plug, an integral bracing strap 72 is interconnected between the ends of the barrier portions 58 and 60. The shutter closure portion 56 further includes an opening 74 enclosed in part by the bracing strap 72 and disposed to permit entry of a plug power blade 77 (FIG. 4) through the power blade slot 34 when the shutter 52 is pivoted such that the barrier portion 58 is in a non-blocking position. The barrier portion 60 is then also in a non-blocking position since the outer edge periphery of the shutter closure portion 56 along the barrier portion 60 (as indicated by the reference character 76) and between the barrier portion 60 and the actuating portion 54 (as indicated by the reference character 78) is sufficiently closely related to the pivot post 62 to permit the other slot 34 to be cleared and permit entry of the other plug power blade 79.

Spring means preferably in the form of a curvilinear spring arm 80 (FIG. 5) urges the shutter 52 to its normally blocking position once an inserted grounding plug is removed. The spring arm 80 preferably has a generally U-shaped end portion 82 disposed in an arcuate groove 84 extending partially about the pivot post 62 on the pivot post side of the shutter closure portion 56. One or more sections of the U-shaped spring end portion 82, for example an end 86 and a section 88 disposed on opposite sides of the pivot post 62, are captivated under one or more overhanging ledges 90 and 92. To facilitate molding of the ledges 90 and 92 without side wedges, respective openings 94 and 96 (FIG. 7) are formed through the closure portion 56 in alignment with the ledges 90 and 92.

Since the spring arm 80 is captivated by the ledges 90 and 92 on the shutter closure portion 56, the combination of the spring arm 80 and the shutter 52 can be conveniently handled as a subassembly in the manufacturing process. The shutter 52 and the spring arm 80 are next conveniently subassembled with the housing cover 26 where a relatively flat continuous surface 94 (FIG. 3) is employed for supporting the shutter subassembly prior to attaching the cover subassembly to the base 24 and the yoke 46. Thus, the pivot post 62 is dropped into the cover recess 64 and a free end 96 of the spring arm 80 is dropped into a cover notch 98.

When the shutter 52 is pivoted in the assembly device, the spring arm end 96 braces the spring arm 80 against any substantial unitary movement and the spring arm 80 is resiliently deflected about the pivot post 62 to provide the spring return force for the shutter 52. With the shutter 52 in the non-locking position shown to the right of FIG. 4, the spring arm 80 which normally extends over the shutter opening 74 is deflected over a shoulder 100 disposed on the closure portion 56 adjacent the opening 74 and coplanar with a bottom surface 102 of the groove 84. A cover abutment 104 (FIG. 4) is engageable with the barrier portion 60 to limit shutter pivotal movement in one direction while an abutment 106 or 108 is engageable with a peripheral shutter edge portion 110 or 112 to limit spring deflection and to limit shutter pivotal movement in the opposite direction.

The shutter 52 is pivoted to its open position by engagement of a grounding prong 114 with the shutter actuator portion 54. The standard grounding plug has a grounding prong which extends a standard distance beyond the outer projecting extent of the power blades so as to assure grounding contact before the power connection is made. This standard plug feature conveniently allows the shutter 52 to be pivoted substantially toward or into its non-blocking or open position by the grounding prong 114 so that the plug power blades 77 and 79 can then freely enter through the receptacle slots 32 and 34.

Camming action by the grounding prong 114 against a surface 116 (FIG. 6) of the actuator portion 54 produces the opening pivotal movement of the shutter 52. For sufficient opening pivotal movement to occur, the surface 116 must generally extend across the grounding contact pocket 40 or 44 and slope inwardly along the pocket 40 or 44 to a predetermined extent. The required inward extent to which the surface 116 must slope in turn requires a minimum overall depth or thickness for the actuator portion 54 as indicated by the reference character 118.

The required thickness for the actuator portion 54 is greater than that needed or required as a maximum limit for closure portion 56 and the actuator portion 54 accordingly has structure thereof extending to at least one side but preferably to both sides of the closure portion 56 as indicated by the reference characters 120 and 122 respectively. The frontally located actuator section 120 thus fits into a recess 124 in the cover 26 and the section 122 extends inwardly into the grounding contact pocket 40 or 44.

Since the duplex grounding only receptacle 20 is characterized with convenient subassembly steps, it is readily and efficiently manufactured. Further, even though extremely limited space is available for shutter structure, efficient and reliable grounding only operation is provided.

In FIGURES 8–14, another embodiment of the invention is shown in the form of a cord connector 130 which can be designed for a wide range of applications including industrial usage. The connector receptacle 130 has a generally circular geometry as contrasted to the generally rectangular geometry of the duplex receptacle 20. Generally, the connector 130 is structured in a manner similar to the connector disclosed in a copending application entitled "Grounding Wiring Device and Contact Structure," Ser. No. 275,972, filed by C. M. Smith on Apr. 26, 1963 and assigned to the present assignee. Accordingly, the connector 130 will be described here only to the extent necessary to the development of an understanding of the manner in which the present invention is embodied in it.

A base or body member 132 and a cover member 134 are secured together to form a housing for the connector 130. The body member 132 has a front side 136 through which a plug 138 can be inserted for conductive attachment to the connector 130. In the similar connector disclosed in the referenced Smith application, the connector front side is formed by a wall integral with the connector body. In this instance, a cavity 140 (FIG. 14) is provided in the front connector side 136 for reception of a frontal member or disc-like member 142 (FIG. 12) with the shutter member 52 supported for pivotal movement between a frontally facing surface 144 of the body member 132 and a rearwardly facing surface 146 (FIG. 11) of the disc 142.

Figure 14:
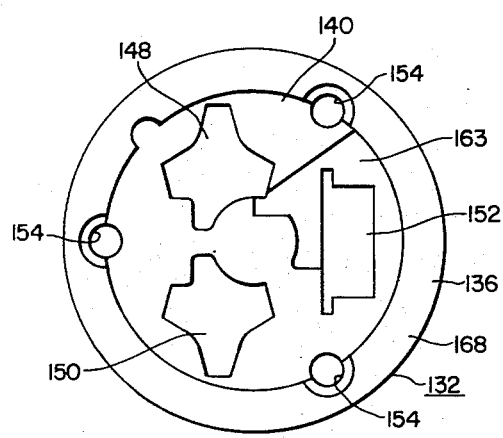
FIG. 14 is a top plan view of the cord connector shown in FIG. 8 with the frontal disc member and the shutter member and other portions thereof removed.
Figure 13:
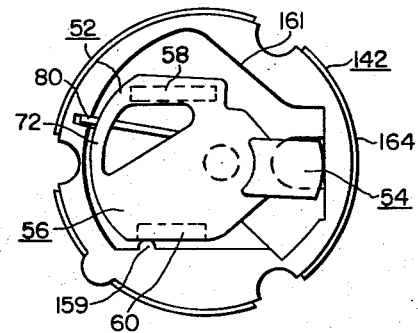
FIG. 13 is a view similar to that shown in FIG. 12 with the shutter member of FIG. 5 assembled with the frontal disc member.

As illustrated in FIG. 14, power contact pockets 148 and 150 and a grounding contact pocket 152 are formed in the body member 132 rearwardly from the shutter support surface 144. Suitable contacts (not shown) similar to those shown in the referenced Smith application can be disposed in the pockets 148, 150 and 152 after the disc 142 and the shutter 52 are assembled with the body member 132. A plurality of openings 154 through the body member 132 are provided for securance screws (not shown) which attach the body member 132 to the cover member 134.

The disc 142 is preferably provided with sufficient thickness to be characterized with substantial rigidity and also to permit a cavity 156 to be formed therein for subassembly placement of the shutter 52 therein. In a manner similar to that described for the duplex receptacle 20, the disc 142 has a recess 158 for receiving the shutter post 62, a notch 160 for retaining the spring arm end 96 and abutment means 159 and 161 for limiting shutter movement. Further, a recess 162 is formed in the disc 142 for receiving the actuator section 120 during pivotal movement of the shutter 52. To provide space for movement of the actuator section 122, a recess 163 is provided in the body member 132 inwardly of the shutter supporting surface 144 and about the grounding contact pocket 152.

When the shutter 52 is subassembled with the disc 142, the combined structure is disposed in the body member cavity 140 until the shutter 52 is seated on the support surface 144. The disc 142 is secured to the body member 132 preferably by a snap arrangement comprising an interfitting ridge 164 and groove 166 formed along confronting peripheral surfaces of the disc 142 and a base member wall portion 168 which forms the side wall of the base member cavity 140. When the grounding only connector 130 is fully assembled, the shutter 52 operates in a manner similar to that described for the duplex receptacle 20 to block the entrance of non-grounding plugs and to permit the entrance of grounding plugs.

The foregoing description has been set forth only to illustrate the principles of the invention. Accordingly, it is desired that the invention be not limited by the embodiments described, but, rather that it be accorded an interpretation consistent with the scope and spirit of its broad principles.

What is claimed is:

1. A grounding only receptacle comprising a housing having a frontal member with a pair of power blade slots and a grounding prong slot extending therethrough, said housing further having a base member to which said frontal member is secured, a shutter member supported between said frontal member and said base member and having an actuating cam portion aligned with said prong slot so as to produce pivotal movement of said shutter in response to insertion of a plug grounding prong, said shutter having a closure portion connected to said cam portion, pivot means engaging said closure portion in pivotal relation to said frontal member, said closure portion having respective barrier portions aligned with said blade slots in one shutter pivotal position and displaced from said blade slots in another shutter pivotal position to provide for entry and conductive engagement of plug power blades within said receptacle, spring arm means engaged with said closure portion and with a portion of said frontal member to urge said shutter normally into its blocking position, and means for limiting pivotal movement of said shutter in at least one direction to define said one pivotal position of said shutter.

2. A grounding only receptacle comprising a housing having a frontal member with a pair of power blade slots and a grounding prong slot extending therethrough, said housing further having a base member to which said frontal member is secured, a shutter member supported between said frontal member and said base member and having an actuating cam portion aligned with said prong slot so as to produce pivotal movement of said shutter in response to insertion of a plug grounding prong, said shutter having a closure portion connected to said cam portion, a pivot post projecting forwardly from said closure portion and disposed in a frontal member recess to engage said shutter in pivotal relation to said frontal member, said closure portion having respective barrier portions aligned with said blade slots in one shutter pivotal position and displaced from said blade slots in another shutter pivotal position to provide for entry and conductive engagement of plug power blades within said receptacle, a curvilinear spring arm having a generally U-shaped end portion, said closure portion having a groove disposed at least partially about said pivot post, said U-shaped spring end portion disposed in said groove, closure ledge means captivating said U-shaped spring end portion in said groove, said spring arm having another end portion, said frontal member having a notch within which said other spring end portion is disposed so that said shutter is normally urged into its blocking position, and means for limiting pivotal movement of said shutter in at least one direction to define said one pivotal position of said shutter.

3. A grounding only receptacle comprising a housing having a frontal member with a pair of power blade slots and a grinding prong slot extending therethrough, said housing further having a base member to which said frontal member is secured, a shutter member supported between said frontal member and said base member and having an actuating cam portion aligned with said prong slot so as to produce pivotal movement of said shutter in response to insertion of a plug grounding prong, said shutter having a closure portion connected to said cam portion and generally having a front side and a rear side, pivot means engaging said closure portion in pivotal relation to said frontal member, said closure portion having respective barrier portions aligned with said blade slots in one shutter pivotal position and displaced from said blade slots in another shutter pivotal position to provide for entry and conductive engagement of plug power blades within said receptacle, spring arms means engaged with said closure portion and with a portion of said frontal member to urge said shutter normally into its blocking position, said cam portion having a portion thereof projecting beyond one of said closure portion sides, and means for limiting pivotal movement of said shutter in at least one direction to define said one pivotal position of said shutter.

4. A grounding only receptacle comprising a housing having a frontal member with a pair of power blade slots and a grounding prong slot extending therethrough, said housing further having a base member to which said frontal member is secured, a shutter member supported between said frontal member and said base member and having an actuating cam portion aligned with said prong so as to produce pivotal movement of said shutter in response to insertion of a plug grounding prong, said shutter having a closure portion connected to said cam portion, pivot means engaging said closure portion in pivotal relation to said frontal member, said closure portion having respective barrier portions aligned with said blade slots in one shutter pivotal position and displaced from said blade slots in another shutter pivotal position for entry and conductive engagement of plug power blades within said receptacle, spring arm means engaged with said closure portion and a portion of said frontal member to urge said shutter normally into its blocking position, said closure portion having an opening therethrough between said barrier portions for insertion of one of the plug blades when said shutter is in its open position, one of said barrier portions having an outer edge surface outwardly of which the other plug blade is inserted when said shutter is in its open position, said closure portion having a strap portion connected between said barrier portions and partly defining said shutter closure portion opening, and means for limiting pivotal movement of said shutter in at least one direction to define said one pivotal position of said shutter.

5. A grounding only receptacle comprising a housing having a frontal member with a pair of power blade slots and a grounding prong slot extending therethrough, said housing further having a base member to which said frontal member is secured, a shutter member supported between said frontal member and said base member and having an actuating cam portion aligned with said prong slot so as to produce pivotal movement of said shutter in response to insertion of a plug grounding prong, said shutter having a closure portion connected to said cam portion and generally having a front side and a rear side, pivot means engaging said closure portion in pivotal relation to said frontal member, said closure portion having respective barrier portions aligned with said blade slots in one shutter pivotal position and displaced from said blade slots in another shutter pivotal position to provide for entry and conductive engagement of plug power blades within said receptacle, spring arm means engaged with said closure portion and a portion of said frontal member to urge said shutter normally into its blocking position, said closure portion having an opening therethrough between said barrier portions for insertion of one of the plug blades when said shutter is in its open position, one of said barrier portions having an outer edge surface outwardly of which the other plug blade is inserted when said shutter is in its open position, said closure portion having a strap portion connected between said barrier portions and partly defining said shutter closure portion opening, said cam portion having a portion thereof projecting beyond one of said closure portion sides, and means for limiting pivotal movement of said shutter in at least one direction to define said one pivotal position of said shutter.

6. A duplex grounding only receptacle comprising a housing having a cover member and a base member, said cover member having a pair of face portions each having a pair of power blade slots and a grounding prong slot extending therethrough, a shutter member supported between each of said face portions and said base member, means securing said base and cover members together, each of said shutter members having an actuating cam portion aligned with the associated grounding prong slot so as to produce pivotal movement of said shutter in response to the insertion of a plug grounding prong, each of said shutters having a closure portion connected to its cam portion, pivot means engaging said closure portion of each shutter in pivotal relation to the associated face portion, said closure portion of each shutter having respective barrier portions aligned with the associated blade slots in one shutter pivotal position and displaced from the associated blade slots in another shutter pivotal position to provide for entry and conductive engagement of plug power blades in said receptacle, spring arm means engaged with said closure portion of each shutter and with a portion of the associated face portion to urge the associated shutter normally into its blocking position, and means for limiting pivotal movement of each shutter in at least one direction to define said one pivotal position of the associated shutter.

7. A grounding only connector receptacle comprising a housing having a base member, said base member having a front side with a recess extending inwardly therefrom, a frontal disc member disposed in said recess and having a pair of power blade slots and a grounding prong slot extending therethrough, a shutter member supported between said disc and said base member, means securing said disc and base members together, said shutter having an actuating cam portion aligned with said prong slot so as to produce pivotal movement of said shutter in response to insertion of a plug grounding prong, said shutter having a closure portion connected to said cam portion, pivot means engaging said closure portion in pivotal relation to said disc member, said closure portion having respective barrier portions aligned with said blade slots in one shutter pivotal position and displaced from said blade slots in another shutter pivotal position to provide for entry and conductive engagement of plug power blades with said receptacle, spring arm means engaged with said closure portion and a portion of said disc member to urge said shutter normally into its blocking position, and means for limiting pivotal movement of said shutter in at least one direction to define said one pivotal position of said shutter.

8. A grounding only connector receptacle as set forth in claim 7 wherein said securing means comprises ridge and groove means disposed about the periphery of said disc and a base member wall which extends about said recess.

9. A grounding only connector receptacle comprising a housing having a base member, said base member having a front side with a recess extending inwardly therefrom, a frontal disc member disposed in said recess and having a pair of power blade slots and a grounding prong slot extending therethrough, a shutter member supported between said disc and said base member, means securing said disc and base members together, said shutter having an actuating cam portion aligned with said prong slot so as to produce pivotal movement of said shutter in response to insertion of a plug grounding prong, said shutter having a closure portion connected to said cam portion and generally having a front side and a rear side, pivot means engaging said closure portion in pivotal relation to said disc member, said closure portion having respective barrier portions aligned with said blade slots in one shutter pivotal position and displaced from said blade slots in another shutter pivotal position to provide for entry and conductive engagement of plug power blades within said receptacle, spring arm means engaged with said closure portion and a portion of said disc member to urge said shutter normally into its blocking position, said cam portion having a portion thereof projecting beyond one of said closure portion sides, and means for limiting pivotal movement of said shutter in at least one direction to define said one pivotal position of said shutter.

References Cited
UNITED STATES PATENTS 3,173,731    3/1965    Anderson _____ 339—14

MARVIN A. CHAMPION, *Primary Examiner.*

JOSEPH H. McGLYNN, *Assistant Examiner.*